No. 894,132. PATENTED JULY 21, 1908.
G. W. FREELAND.
WEIGHING MECHANISM FOR COAL POCKETS.
APPLICATION FILED OCT. 23, 1907.
4 SHEETS—SHEET 1.
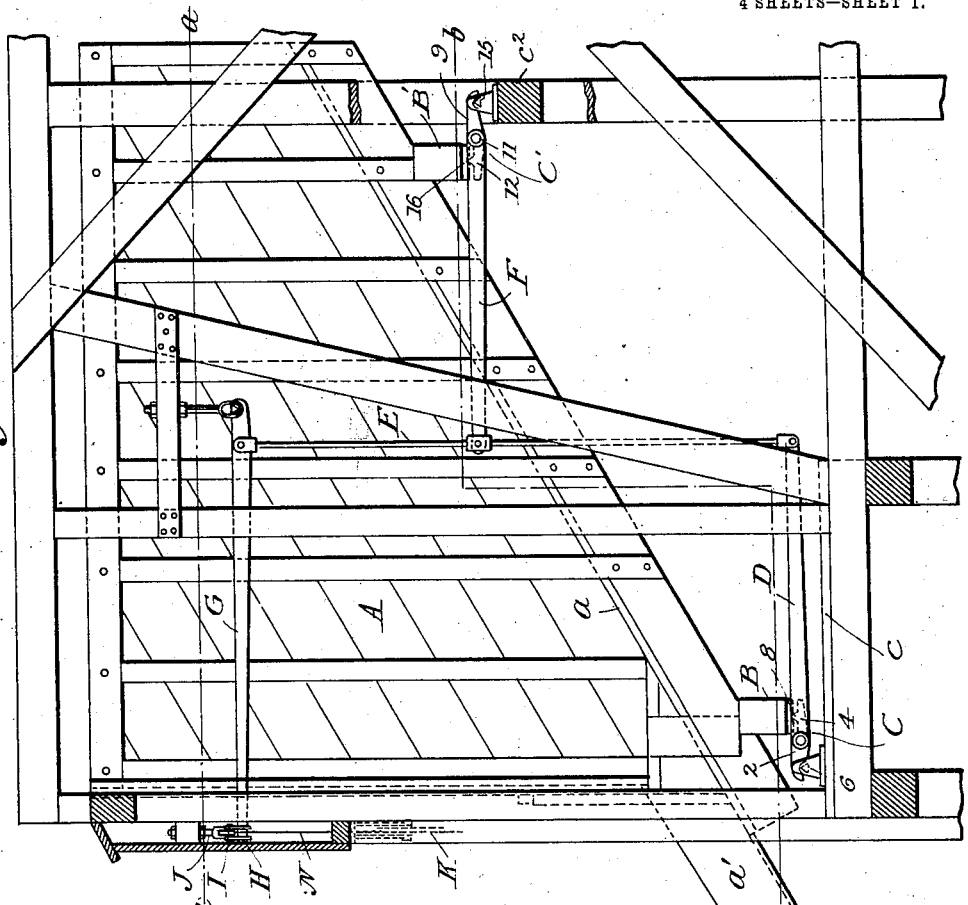
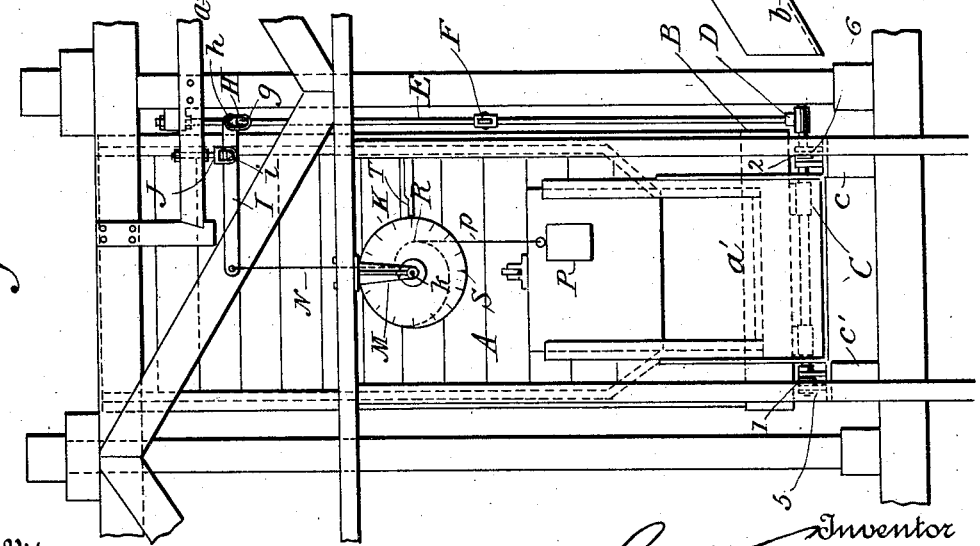
Witnesses
S. F. Barnes.
L. E. Morrison.
Inventor
G. W. Freeland
By P. T. Dodge
Attorney No. 894,132. PATENTED JULY 21, 1908.
G. W. FREELAND.
WEIGHING MECHANISM FOR COAL POCKETS.
APPLICATION FILED OCT. 23, 1907.
4 SHEETS—SHEET 2.

Witnesses
Inventor
G. W. Freeland
By P. F. Dodge, Attorney

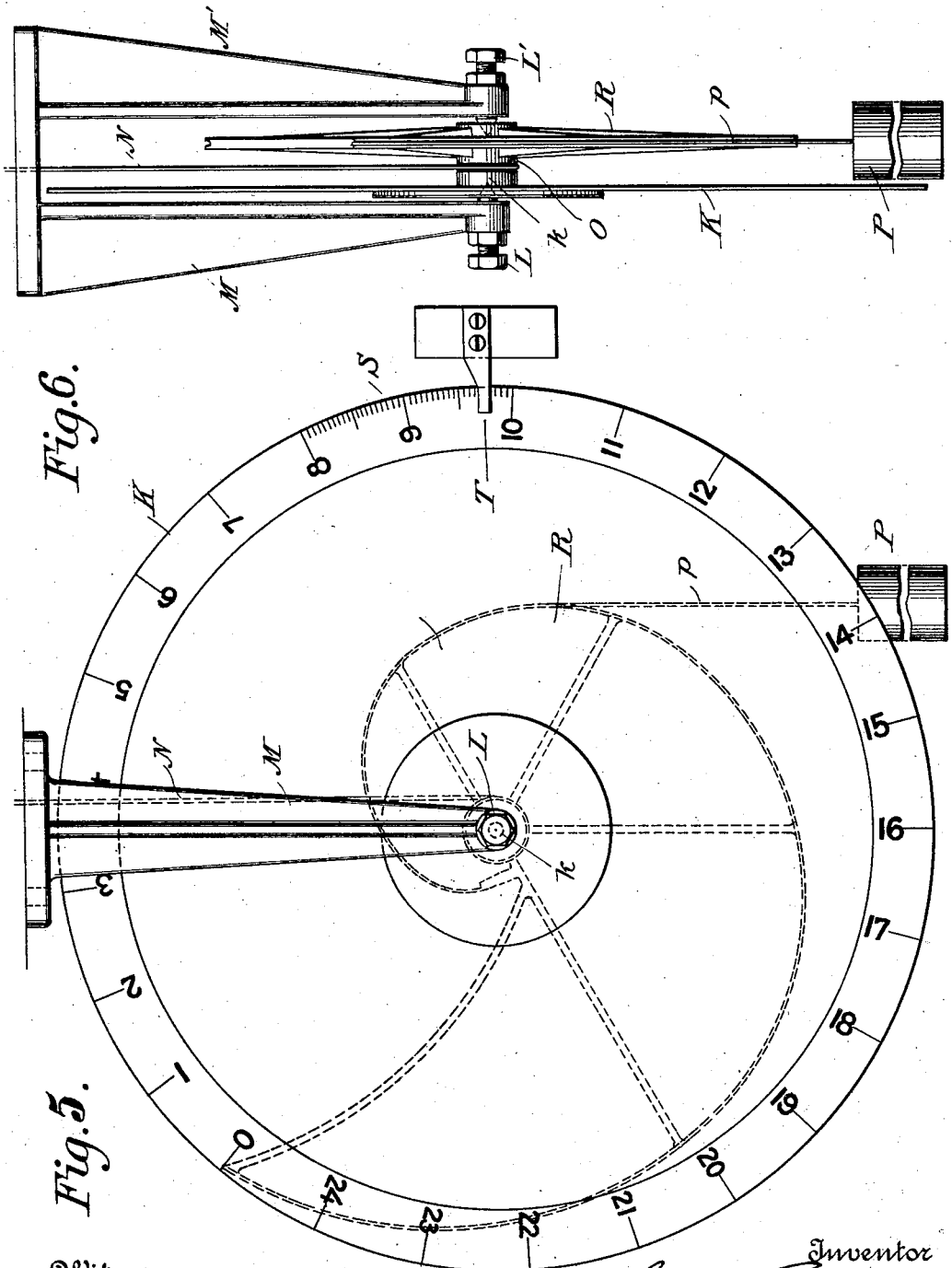

No. 894,132. PATENTED JULY 21, 1908.
G. W. FREELAND.
WEIGHING MECHANISM FOR COAL POCKETS.
APPLICATION FILED OCT. 23, 1907.
4 SHEETS—SHEET 4.
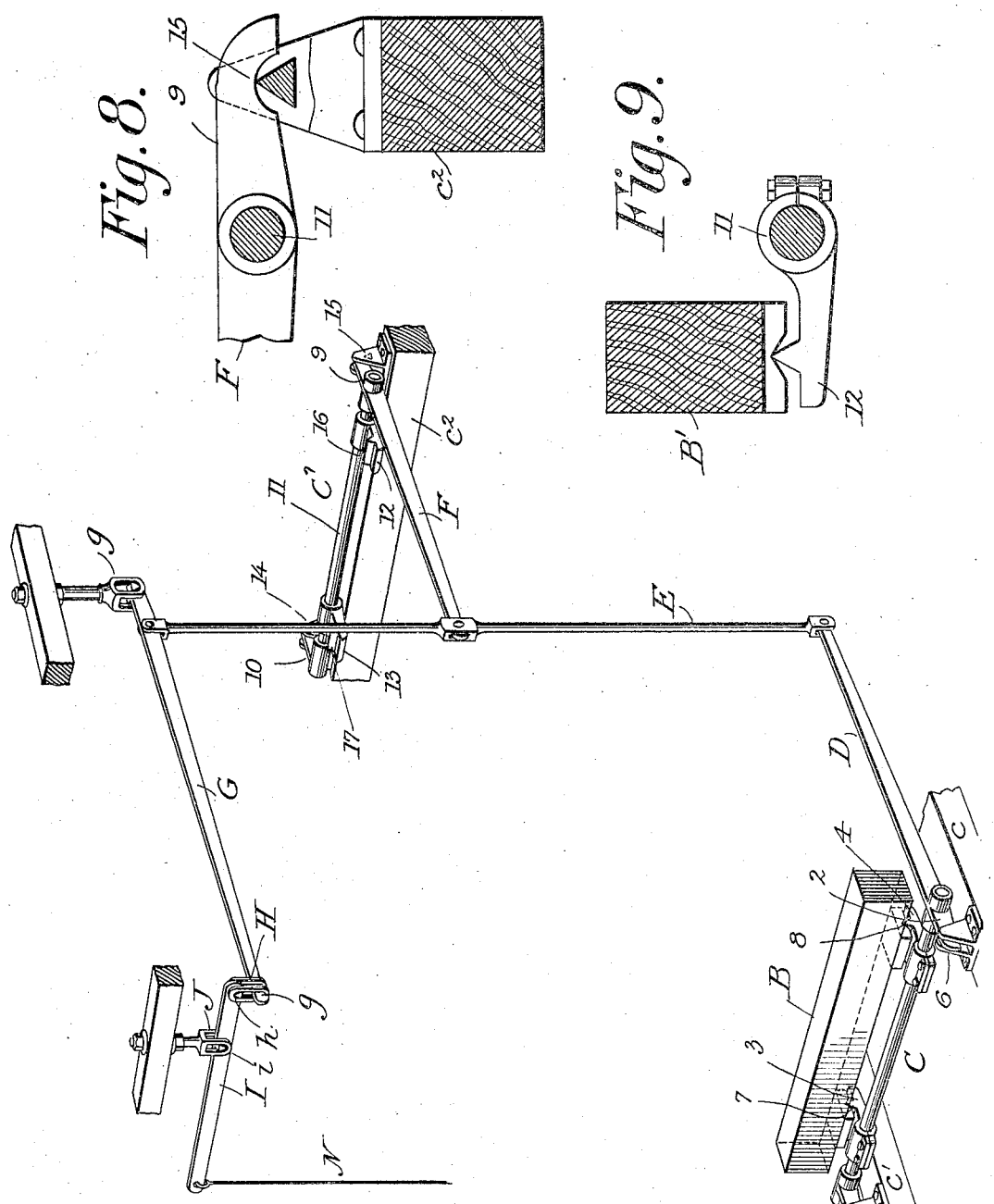

UNITED STATES PATENT OFFICE.

GEORGE W. FREELAND, OF MOLINE, ILLINOIS, ASSIGNOR TO WILLIAMS, WHITE AND COMPANY, A CORPORATION OF ILLINOIS.

WEIGHING MECHANISM FOR COAL-POCKETS.

No. 894,132.  Specification of Letters Patent.  Patented July 21, 1908.

Application filed October 23, 1907. Serial No. 398,733.

*To all whom it may concern:*

Be it known that I, GEORGE W. FREELAND, of Moline, county of Rock Island, and State of Illinois, have invented a new and useful Improvement in Weighing Mechanism for Coal-Pockets, of which the following is a specification.

This invention relates to a weighing mechanism or scale for use more particularly in connection with coaling stations for locomotives to indicate automatically the weight of the coal in the storage bin or coal pocket.

The invention consists of a scale mechanism of improved form and construction, and in combination therewith a coal pocket or bin, having its bottom movably sustained by the scale mechanism, in such manner that the weight of the contents acting on the scale mechanism will automatically actuate the same, and cause the weight of the load to be indicated on a dial, and this without the necessity of applying or removing weights, or otherwise manually manipulating or adjusting the parts.

The invention further consists in the details of construction and combination of parts hereinafter described and claimed.

Figure 3:
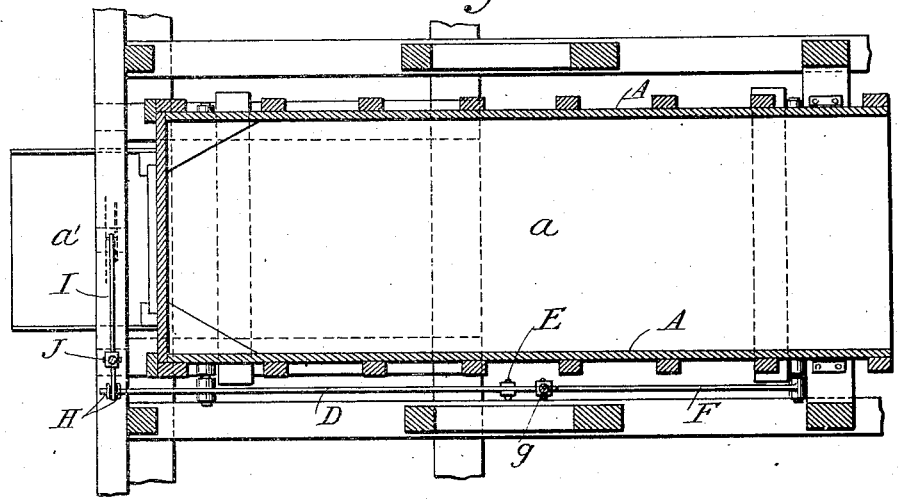
Figure 4:
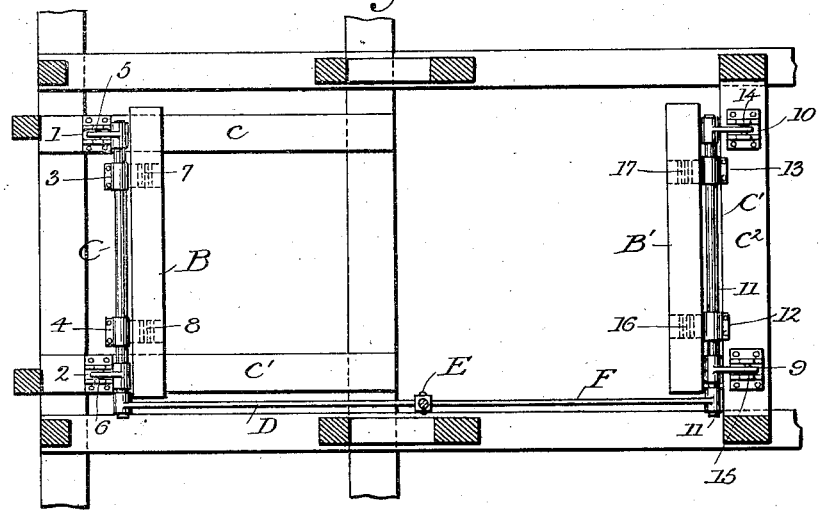

In the accompanying drawings:—Figure 1 is a side elevation of a coal pocket, showing my invention applied thereto. Fig. 2 is a front elevation of the same. Fig. 3 is a horizontal sectional plan view on the line $a$—$a$ of Fig. 1. Fig. 4 is a similar view on the line $b$—$b$ of Fig. 1. Fig. 5 is an elevation on an enlarged scale of the indicating dial. Fig. 6 is an edge view of the same (looking in the direction of the arrow in Fig. 2,) and connected parts. Fig. 7 is a perspective view of the lever mechanism. Figs. 8 and 9 are detail sectional views of the knife-edge bearings.

Referring to the drawings:—The coal pocket or bin is indicated at A and is formed with an inclined bottom $a$ and is boarded up at its sides rear and front so that a quantity of coal may be stored therein and from it discharged by means of a spout $a'$, into the locomotive tender. At its front and rear, the bottom has fixed to its under side, transverse beams B and B', respectively, the beam B' being, by reason of the upward inclination of the bottom, considerably above the level of the beam B. These beams project at their ends a slight distance beyond the side walls of the pocket, and are seated on pivotal frames C and C', which frames are mounted to rock on a transverse horizontal axis, the frame C being sustained at the front on horizontal fixed longitudinal beams $c$ and $c'$, extending at the sides of the coal pocket; and the frame C' being sustained by a horizontal transverse fixed beam $c^2$ at the rear of the pocket, the beams $c$, $c'$ and $c^2$ constituting members of a fixed frame-work within which the pocket or bin is mounted, and in relation to which it is movable bodily vertically on the two pivotal frames C and C'.

The pivotal frames C and C' constitute parts of a scale mechanism, and are connected by means of pivoted beams and levers with an indicating dial, and counterweighted in such manner that, as will be presently described, the weight of the load of coal on the inclined bottom will be indicated automatically by the dial.

The pivotal frame C is formed with parallel longitudinal arms 1 and 2, connected together by a transverse shaft $3^a$, from which project inwardly two arms 3 and 4. The under sides of arms 1 and 2 are formed with V-notches resting on knife edges 5 and 6 projecting upwardly from plates or brackets fastened to the longitudinal beams $c$ and $c'$, before alluded to. The arms 3 and 4 are provided with upwardly projecting knife edges 7 and 8 which enter V-notches in the under side of the transverse beam B. The other pivotal frame C' is of similar construction, being provided with parallel arms 9 and 10, connected by transverse shaft 11 from which projects forwardly arms or lugs 12 and 13. The parallel arms 9 and 10 contain in their under sides V-notches, resting on knife edges 14 and 15, projecting upwardly from plates on the transverse beam $c^2$, before alluded to. The arms 12 and 13 are formed with knife edges engaging V-notches in the under side of transverse beam B'. As a result of this construction, the weight of the pocket and its contents, acting through the transverse beams B and B' on the pivotal frames, will depress the latter at their inner edges, causing them to fulcrum on the knife edges 5 and 6, and 14 and 15, respectively.

Extending rearwardly from the side arm 2 of the pivotal frame C is a longitudinal lever or arm D, jointed at its rear end to the lower end of a vertical bar E, which bar has jointed to it, at a point above the connection of lever D, the forward end of a horizontal lever F, whose rear end is fixed to and forms a continuation of the arm 9 of the pivotal frame C'. The upper end of the bar E is jointed to a horizontal forwardly extending lever G near the rear end of the same, which lever is pivotally hung at its extreme rear end between suspending links $g$, suitably sustained from the fixed frame-work at the side of the pocket, the connection of the lever with the link being in the form of knife edges on the sides of the lever, seated in V-notches in the bottoms of the links. The horizontal lever G extends forwardly along the side of the pocket, and has its forward end terminating at the front of the same, at which point it is formed with a knife edge $g'$ resting in notches in the bottoms of vertical links H, which links rest at their upper ends on knife edges $h$ projecting from the sides of a scale beam I at its rear end. This beam extends transversely at the front of the pocket and is pivotally suspended from the fixed framework by means of knife edges $i$ on the sides of the same entering V-notches in the bottom of links G, sustained by said frame-work.

As a result of the construction described, it will be observed that the weight of the load in the pocket will act by means of the two pivotal frames C and C', to depress the inner ends of the two horizontal levers D and F, which, owing to their connection with the vertical bar E, will correspondingly depress the same. The bar E by connection at its upper end with the lever G, will cause its forward end to be lowered, which action, owing to the connection of the lever G with the scale beam I, will raise the inner end of the same.

The upward movement of the scale beam I is caused to rotate a vertically arranged indicating dial K, fixed on a horizontal shaft $k$, mounted to revolve between bearing points L and L', projecting inwardly from the lower ends of two hanger arms M and M', fixed at their upper ends to the fixed frame-work. The end of the scale beam I is connected by means of a cord N to a drum O on the shaft $k$, so that when the end of the scale beam moves upwardly, due to the weight of the load on the inclined bottom of the pocket, the shaft and the dial will be rotated. Acting to resist this rotation of the dial, and consequently the movement of the scale mechanism, is a weight P, connected to the end of a tape or band $p$, fixed at its upper end to a cam R, fixed to the shaft $k$. The cam is formed with a rim or edge on which the tape is wound as the shaft is rotated, which edge is of general spiral form or contour, its distance from the center increasing gradually as the outer end of the cam is approached. By reason of this arrangement, a gradually increasing resistance is offered by the weight to the movement of the parts of the scale mechanism, the resistance increasing until the parts come to rest or balance. The dial has graduations S marked thereon, which are adapted to be read in connection with a fixed pointer T, and the graduations are fixed or determined with reference to the increasing resistance offered by the weight, and the movement of the parts caused by the weight of the contents of the pocket, so that the dial as it is turned automatically to the point of register or rest as the weight of the load varies from maximum to minimum, will indicate the weight of the coal in the pocket.

It will be observed that as a result of the construction described, the weight of the coal is visible at once, and determined automatically without the necessity of applying or removing weights, or of otherwise manually manipulating or adjusting any part of the mechanism.

Having thus described my invention, what I claim is:—

1. In combination with a coal pocket, pivotal frames supporting the same at the front and rear and fulcrumed on horizontal transverse axes, a vertical bar, longitudinally extending levers connected to the pivotal frames and jointed to said bar, a longitudinally extending lever G jointed to the bar, a transverse scale beam jointed to said lever G, a rotary indicating dial, a drum operatively connected therewith, a cord connecting the drum with the scale beam, a cam operatively connected with the dial, and a weight suspended from said cam.

2. In combination of a scale pocket, an inclined bottom therefor, a pivotal frame sustaining the front of the bottom, a second pivotal frame sustaining the bottom at the rear, a vertical bar, a horizontal lever extending rearwardly from the front pivotal frame and jointed to the lower end of the bar, a second horizontal lever connected to the rear pivotal frame and jointed to the bar at a point above the connection of the first horizontal lever therewith, an indicating mechanism, and operative connections between the same and the vertical bar.

3. In combination with a coal pocket or bin movable vertically, pivotal supports mounted in different horizontal planes at the front and rear, and sustaining the same from beneath, levers connected to said supports and extending inwardly at the side of the pocket, a vertical bar extending at the side of the pocket and having the ends of said levers jointed to it, a longitudinally extending lever connected with the upper end of said bar and extending forwardly to the front of the pocket, and an indicating device at the front of the pocket operatively connected with said lever.

4. In combination with an upright framing, pivotal supports sustained by the same at the front and rear respectively, a coal pocket or bin having a discharge opening at the front and sustained at its front and rear on said front and rear pivotal supports respectively to move vertically, horizontal levers D and F extending inwardly towards each other from said pivotal supports, a vertical bar E to which the inner ends of said levers are jointed, a longitudinally extending lever G connected between its ends to the upper end of the bar E and jointed at its rear end to the fixed framing to be moved vertically by the weight of the pocket and extending forwardly to the front of the framing, counterpoising means acting to resist said movement and an indicating device sustained at the front of the framing and operatively connected with the forward end of the lever G.

In testimony whereof I hereunto set my hand this 12th day of October, 1907, in the presence of two attesting witnesses.

GEORGE W. FREELAND.

Witnesses:
EDWARD S. WHITNEY,
FREDERICK A. FREEARK.